United States Patent [19]

Araud

[11] Patent Number: 5,082,590

[45] Date of Patent: Jan. 21, 1992

[54] POLYDIMETHYLSILOXANE/MQ RESIN ANTIFOAMING COMPOSITIONS

[75] Inventor: Claude Araud, Ecully, France

[73] Assignee: Rhone-Poulenc Chimie, Courbevoie, France

[21] Appl. No.: 280,881

[22] Filed: Dec. 7, 1988

[30] Foreign Application Priority Data

Dec. 8, 1987 [FR] France ................ 87 17368

[51] Int. Cl.$^5$ .............. B01D 19/00; B01D 19/04; B01J 13/00
[52] U.S. Cl. ................ 252/321; 252/358; 252/308; 252/312
[58] Field of Search ............ 252/321, 358, 174.15, 252/307, 308, 312

[56] References Cited

U.S. PATENT DOCUMENTS

| | | | |
|---|---|---|---|
| 2,632,736 | 3/1953 | Currie | 252/358 |
| 3,408,306 | 10/1968 | Boylan | 252/321 |
| 3,455,839 | 7/1969 | Rauner | 252/321 |
| 3,865,859 | 2/1975 | Plumb | 252/321 X |
| 4,082,690 | 4/1978 | Farminer | 252/321 |
| 4,104,186 | 8/1978 | Caffarel et al. | 252/321 X |
| 4,145,308 | 3/1979 | Simoneau et al. | 252/321 |
| 4,324,595 | 4/1982 | Kasprzak | 134/42 X |
| 4,486,336 | 12/1984 | Pape et al. | 252/321 |
| 4,685,930 | 8/1987 | Kasprzak | 252/153 X |
| 4,749,740 | 6/1988 | Aizawa et al. | 252/321 X |
| 4,788,001 | 11/1988 | Narula | 252/312 |

Primary Examiner—Robert L. Stoll
Assistant Examiner—Daniel S. Metzmaier
Attorney, Agent, or Firm—Burns, Doane, Swecker & Mathis

[57] ABSTRACT

Fluid organopolysiloxane antifoaming compositions, devoid of inorganic filler material and adopted for use in both nonaqueous and aqueous systems, for example detergent powders and liquids and crop-protection formulations, characteristically having a viscosity of less than 50,000 mPa.s at 25° C., include (A) at least one substantially linear polydimethylsiloxane polymer, (B) a methylpolysiloxane resin comprising recurring structural units of the formulae $R(CH_3)_2SiO_{0.5}$ and $SiO_2$, wherein R is an alkyl radical containing from 1 to 3 carbon atoms, or a vinyl radical, with the ratio of the number of $R(CH_3)_2SiO_{0.5}$ recurring units (M units) to the number of recurring $SiO_2$ units (Q units) ranging from 0.4 to 1.2, and (C) a cyclic polydiorganosiloxane of the formulae:

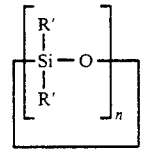

wherein the symbols R', which may be identical or different, are each a radical R or a hydrogen atom, and n is an integer ranging from 3 to 15.

13 Claims, No Drawings

POLYDIMETHYLSILOXANE/MQ RESIN ANTIFOAMING COMPOSITIONS

BACKGROUND OF THE INVENTION

1. Field of the Invention

The present invention relates to a silicone antifoaming composition free from inorganic filler material, and which comprises a diorganopolysiloxane (A), and MQ resin (B) and a cyclic polydiorganosiloxane (C).

2. Description of the Prior Art

It is known to this art that certain silicones, if desired in combination with siliceous inorganic fillers, exhibit antifoaming properties and can be employed by virtue of this property in foaming systems which are aqueous (for example in detergents) and/or nonaqueous (for example petroleum products).

Thus, U.S. Pat. No. 4,145,308 describes that an aqueous emulsion of the combination (A) and (B) by itself, or preferably together with silica and, if desired, with oleic acid, has an antifoaming effect.

U.S. Pat. No. 3,455,839 describes the use of an antifoam composition for an aqueous system comprising the constituents (A) and (B) together with a siliceous inorganic filler, and U.S. Pat. No. 4,486,336 suggests the use of two silicone oils of different viscosities for (A) as an improvement over the compositions of the '839 patent.

U.S. Pat. No. 4,082,690 describes an antifoam composition for a nonaqueous system, which is a combination of the constituents (A) and (B) together with a hydrocarbon solvent.

U.S. Pat. No. 4,104,186 describes, as an antifoam composition, the combination of (A) with a methylsilses-quioxane resin consisting essentially of a T unit, adapted more particularly for detergent compositions. This antifoam is preferably combined with treated silica.

An antifoam composition comprising only the constituents (A) and (B) (U.S. Pat. No. 4,145,308) has a very good antifoaming capacity, but this binary combination, not dissolved in a hydrocarbon solvent, has no practical use because of its very high viscosity.

If a treated silica is added (U.S. Pat. No. 3,455,839) to this binary combination of (A) and (B), a more fluid antifoam is indeed obtained, but there is a risk that the silica may settle out during storage. Moreover, an antifoam of this type cannot be employed for petroleum media because of the presence of silica and, as a general rule, in systems to be treated where a solid filler is undesirable.

If a hydrocarbon solvent is added instead of silica (U.S. Pat. No. 4,082,690) to this binary combination of (A) and (B), an antifoam is obtained which is suitable for nonaqueous media, but which is unsuitable for aqueous media, in particular for use with detergents.

SUMMARY OF THE INVENTION

Accordingly, a major object of the present invention is the provision of an improved fluid antifoaming composition comprising only polyorganosiloxane constituents which are devoid of silica and which can be used for both aqueous and nonaqueous systems.

Another object of the invention is the provision of an improved fluid, nontoxic antifoaming composition adapted for detergent powder or liquid compositions, and which does not attach or deposit onto the fabrics to be washed or onto the walls of the washing machines.

Briefly, the present invention features a fluid antifoaming composition free from inorganic filler material which comprises:

(A) 15 to 80% by weight of at least one substantially linear polydimethylsiloxane polymer (B) 1 to 15% by weight of a methylpolysiloxane resin comprising recurring structural units of the formulae $R(CH_3)_2SiO_{0.5}$ and $SiO_2$, in which the symbol R represents an alkyl radical containing from 1 to 3 carbon atoms or the vinyl radical, with a ratio of the number of $R(CH_3)_2SiO0.5$ units to the number of $SiO_2$ units ranging from 0.4 to 1.2, inclusive; and (C) 5 to 84% by weight of a cyclic polydiorganosiloxane of the formula:

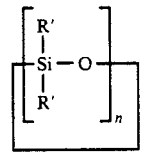

in which the symbols R', which may be identical or different, are each a radical R or a hydrogen atom and n is an integer ranging from 3 to 1 inclusive; said antifoaming composition having a viscosity below 50,000 mPa.s at 25° C.

DETAILED DESCRIPTION OF THE PREFERRED

More particularly according to the present invention, all of the above percentages are percentages by weight, calculated relative to the total weight of the constituents (A), (B) and (C). Furthermore, in the description that follows, all percentages and parts are also given by weight, unless otherwise indicated.

The following compositions are more particularly preferred:

(A) : 30 to 50%,
(B) : 3 to 10%,
(C) : 40 to 67%.

The polymers (A) are abundantly described in the literature and are available commercially. More especially, it is preferable to employ polymers (A) blocked by a trimethylsiloxyl unit at each end of their polymer chain. However, polymers which are blocked otherwise, for example by a hydroxyl group or by a unit $(RO)_3SiO_{0.5}$, with R being an alkyl radical containing from 1 to 3 carbon atoms, are also within the ambit of the invention.

The viscosity of (A) may vary over wide limits of from 10 to $10^6$ mPa.s, preferably from 30,000 to 150,000 mPa.s at 25° C.

It is also possible to use a mixture of polymers (A) having different viscosities.

By "substantially linear polymers (A)" are intended polymers containing, in the polymer chain, not more than 3% of siloxane units other than the units D (dimethylsiloxy), on a numerical basis.

The methylsiloxane resin (B) is a product which is well known to the silicone art, and it is also available commercially. In addition to the vinyl radical, R may be a methyl, ethyl, isopropyl or n-propyl radical.

A process for the production of these resins is described, for example, in French Patents Nos. FR-A-1,046,736 and FR-A-1,134,005. The operation is carried out in inert solvents and the resins thus prepared are stored in these solvents, such as: toluene, xylene, cyclohexane, methyl-cyclohexane and chlorobenzene. The final product solutions contain from 30 to 75% by weight of resin.

These resins generally contain from 0.5 to 6% by weight of hydroxyl groups bonded to silicon. The presence of these hydroxyl group is not detrimental to the antifoaming effect. However, if desired, the hydroxyl content can be lowered, particularly by a reaction with a monofunctional silane such as trimethylchlorosilane, by following, for example, the procedure of FR-A-1,526,681.

In an alternative embodiment, the methylpoly-siloxane resin may additionally comprise up to 10%, on a numerical basis, of a recurring structural unit of the formula $CH_3RSiO$, wherein R is as defined above, relative to the number of M units: $R(CH_3)_2SiO_{0.5}$ and Q units: $SiO_2$.

It is preferred to employ the resins (B) in which R is methyl, essentially for availability and cost reasons. These are then designated MQ or MDQ resins.

The constituent (C) is a cyclic polydiorgano-siloxane having the formula:

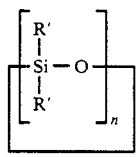

wherein R' and D are as defined above.

This constituent (C) serves, in fact, as a diluent for the constituents (A) and (B).

When compared with the hydrocarbon solvents employed previously, this constituent (C) presents the advantage of providing a better compatibility with the constituents (A) and (B) and also exhibits a certain antifoaming effect which the hydrocarbon solvents do not have.

In addition, the use of (C) instead of a hydrocarbon solvent makes it possible to employ the antifoam compositions according to the invention in aqueous systems, such as biological fermentation compositions, detergent powder and liquid compositions and pesticidal compositions.

These antifoam compositions may be readily formulated into aqueous emulsions or dispersions, using conventional methods.

When compared with the silica heretofore employed in this art, this constituent (C) has the advantage, distinguishing it from silica, of not settling out during storage and of resulting in an antifoam composition which can be employed in media where it is impossible to introduce silica, for example in petroleum media and in hydraulic fluids.

The compound (C) can be any liquid o solid product, on the threefold condition that it is inert towards the constituents (A) and (B), that it is soluble in the mixture of the constituents (A) and (B), and that it produces a composition which is sufficiently fluid to be handleable, that is to say, that such composition has a viscosity below 50,000 mPa.s, preferably below 20,000 mPa.s and even more preferably ranging from 100 to 10,000 mPa.s at 25° C.

The following are representative, for example, of compounds (C) which are liquid at 25° C and suitable for use according to the invention:
$D_4$, $D_5$, $D_6$, $D_7$, $D'_n$ with = 3 to 15 inclusive,
$(D^{Vi})_n$ with n = 3 to 6, $D^{Et'}_2$, $D^{Et'}_5$,
D is the unit $(CH_3)_2SiO$,
D' is the unit $(CH_3)HSiO$,
$D^{Vi}$ is the unit $(CH_2=CH)(CH_3)SiO$,
$D^{Et}$ is the unit $(CH^3)(C_2H_5)SiO$.

$D_3$, and $D^{Et}_4$ are representative, for example, of compounds (C) which are solid at 25° C. and which are also suitable for use according to the invention.

The compounds (C) and processes for preparing same are known to this art and are abundantly described in the literature. Furthermore, most of them are available commercially.

The use of $D_3$, $D_4$, $D_5$ and of various possible mixtures thereof is more particularly preferred, because of their availability and low cost.

The compositions according to the invention may be prepared, preferably, by the following method:

The starting material is resin (B) in solution in an organic solvent (generally 30 to 70% by weight of resin in the solution).

An appropriate amount of polydimethylsiloxane polymer (A) is added, under stirring, to this solution. The mixture is homogenized and all of the solvent is removed by known means, such as by evaporation of the solvent by heating, by extraction under reduced pressure, or by a combination of both techniques.

The compound (C) is added to the homogeneous mixture of (A) and (B) thus obtained. In general, a simple cold homogenization is sufficient. Slight heating from 60° to 150° C. may be appropriate, especially in the case where the compound (C) is solid.

The compositions can be incorporated, as such, into the foaming system at any suitable stage of the treatment, using an known technique whatsoever. By way of illustration, it is possible to employ the compositions to break or to remove a certain height of existing foam, or to introduce them into the system before the appearance of foaming, in order to prevent (hinder) the latter. The foaming system to be treated may be selected, in particular, from petroleum media, biological fermentation media, detergent liquid or powder compositions and aqueous plant-protective emulsions.

The amount of composition which is employed to reduce or prevent the foam may vary over wide limits. These limits vary as function of the nature of the system to be treated, of the severity (of the intensity) of the foaming generated by the system at a given time. The amount employed generally ranges from 1 to 200, in most cases from 5 to 100 parts of the silicone antifoaming composition per million parts of aqueous or nonaqueous system to be treated.

However, in the case of certain specific applications, the amounts used may be higher.

Thus, it has been found that the antifoaming composition in accordance with the invention can be employed in a dosage of 0.05 to 2, preferably of 0.1 to 1 part of silicone antifoam per 100 parts of detergent slurry before spraying.

This detergent slurry is generally the aqueous solution of the mixture of surfactant system, of polyphosphate and of sodium sulfate, which is ejected through spraying towers in order to obtain a detergent powder.

The addition of the antifoam to this slurry makes it possible to deaerate it effectively and to produce a denser washing powder.

It is also possible to employ the antifoam composition according to the invention in the form of an aqueous dispersion (emulsion) of the oil-in-water type. In this form, the compositions according to the invention disperse more readily in foaming aqueous systems and act more quickly.

To prepare these emulsions, the surface-active agents employed may be those typically employed fo emulsifying silicones, insofar as they are compatible with the system to be treated. Commercially available nonionic surface-active agents such as the following are generally employed:

(i) esters of acids and of sorbitol, or of its anhydrides, such as sorbitan monostearate;

(ii) esters of fatty acids and of polyethylene glycols, such as polyoxyethylenated stearates;

(iii) esters of fatty acids and of sorbitol, or of its anhydrides, which have reacted with 4 to 25 moles of ethylene oxide, such as polyoxyethylenated sorbitan monostearate; and (iv) polyoxyethylenated alkylphenols, such as polyoxyethylenated nonylphenol.

From 5 to 50 parts of surfactant per 100 parts of constituent (A) are generally employed to prepare these emulsions. Water and the surface-active agent may be mixed, for example, at a temperature of from 60° to 100° C. under vigorous stirring with a shearing action and the antifoam composition added while adding water, if desired, and heating to a temperature of 60° to 100° C. while maintaining vigorous stirring with a shearing action. The cooled emulsion is then passed through a colloid mill and the millbase is diluted with water in order to produce the final antifoam emulsion.

In order to further illustrate the present invention and the advantages thereof, the following specific examples are given, it being understood that same are intended only a illustrative and in nowise limitative.

EXAMPLE 1 AND COMPARATIVE EXAMPLE 1C

Determination of the antifoaming power

In order to determine the antifoaming power of the compositions prepared in the examples, a laboratory multipurpose agitating device was used which had an oscillating horizontal shaft to which there were fastened, at right angles and horizontally, metal arms, the ends of which were provided with clamps which opened sufficiently to firmly hold powder dispensers made of glass, 250 cm³ in capacity.

The oscillation frequency of the shaft was approximately 250 per minute; the amplitude of each oscillation in the region where the powder dispensers were inserted was 5 cm. A defoaming cycle consisting of an agitation time of 10 seconds and a rest time of 60 seconds could be established by setting an electronic timer.

100 cm³ of a foaming system M1 to M4 (defined hereinafter) and 5 mg of antifoam composition were introduced into each glass powder dispenser and the agitation of the apparatus was commenced. The time in seconds taken by the foam in the powder dispenser to disappear was noted during the first defoaming cycle, after the agitation had stopped, and therefore during the rest period of 60 seconds; this was the time required for the first defoaming $T_1$.

The total number of defoaming cycles in the case of which the defoaming time was shorter than or equal to 60 seconds was then noted; this number is designated N.

Preparation of the antifoam composition of Example 1

The starting material was 7.5 parts of MQ resin (B) in solution in 50 parts of xylene. The MQ resin had the following characteristics:

(i) numerical ratio of the M units to the Q units: 0.76;

(ii) % by weight of hydroxyl group: 2.5.

To this solution were added 42.5 parts of α, ω-(trimethyslsiloxy)polydimethylsiloxane oil (A) having a viscosity of 100,000 mPa s at 25° C., under vigorous stirring. The mixture was heated to 150° C. under a reduced pressure of 8 kPa until all the xylene had been removed. 50 parts of decamethylcyclopentasiloxane (C) were then added by simple cold mixing. The antifoam was obtained in the form of a homogeneous mixture exhibiting a viscosity of 4,500 mPa.s at 25° C. and having the following composition:

(A) : 42.5%,
(B) : 7.5%, and
(C) : 50%.

Preparation of the antifoam composition of Comparative Example 1c

This had the same constituents (A) and (B) and the same contents, except that the constituent (C) was replaced completely with xylene.

This antifoam was prepared in accordance with the teaching of U.S. Pat. No. 4,082,690 and, therefore, had the following composition:

(A) : 42.5%,
(B) : 7.5%,
Xylene (C) : 50%,
viscosity of the mixture at 25° C.: 850 mPa.s.

Characterization of the foaming systems M1 to M4

| Foaming system M1: | | |
|---|---|---|
| (i) | Distilled water | 1,000 cm³ |
| (ii) | Sodium dioctylsulfosuccinate | 5 g |
| Foaming system M2: | | |
| (i) | Distilled water | 1,000 cm³ |
| (ii) | Polyoxyethylenated nonylphenol containing approximately 10 polyethylene oxide units | 5 g |
| System M3: | | |
| (i) | Distilled water | 1,000 cm³ |
| (ii) | Commercial washing powder without antifoam | 5 g |
| System M4: | | |
| (i) | Distilled water | 1,000 cm³ |
| (ii) | Aqueous suspension of Isoproturon ® pesticide marketed by Rhone-Poulenc Agrochimie | 5 g |

The antifoaming capacity of the compositions of Examples 1 and 1c in a dosage of 50 ppm (parts per million parts of M1 to M4) was determined on these four foaming systems M1 to M4.

The results obtained are reported in Table 1 below:

TABLE 1

| Foaming system | Antifoam of Example | *T1 (in s) | +N |
|---|---|---|---|
| M1 | 1 | 4 | 102 |
|  | 1c | 6 | 49 |
| M2 | 1 | 7 | 114 |
|  | 1c | 8 | 105 |

TABLE 1-continued

| Foaming system | Antifoam of Example | *T1 (in s) | +N |
|---|---|---|---|
| M3 | 1 | 4 | 10 |
|  | 1c | 9 | 4 |
| M4 | 1 | 4 | 63 |
|  | 1c | 5 | 18 |

From Table 1, it will clearly be seen that the antifoaming capacity of the product of Example 1 was, in the case of each of the media M1 to M4, greatly superior to that of the product of the Comparative Example 1c.

EXAMPLES 2 TO 5 AND COMPARATIVE EXAMPLE 6C

Antifoam compositions were prepared by following the operating procedure of Example 1, the nature and the content of the constituents (A), (B) and (C) being varied, and their antifoaming capacity was then evaluated for the foaming systems M1 and M2, also in a dosage of 50 ppm.

Comparative Example 6c included no constituent (C).

The results obtained, and the characterization of the antifoams, are reported in Table 2 below:

TABLE 2

| Example | (A) % | γ (A) mPa s | (B) % | (C) % | (C) | γ (A) + (B) + (C) | M1 T1 | M1 N | M2 T1 | M2 N |
|---|---|---|---|---|---|---|---|---|---|---|
| 1 | 42.5 | 100,000 | 7.5 | 50 | D5 | 4,500 | 4 | 102 | 7 | 114 |
| 2 | 42.5 | 300 | 7.5 | 50 | D5 | 40 | 12 | 2 | 4 | 18 |
| 3 | 42.5 | 60,000 | 7.5 | 50 | D5 | 2,500 | 5 | 95 | 8 | 95 |
| 4 | 42.5 | 100,000 | 7.5 | 50 | D4 | 4,000 | 4 | 80 | 7 | 109 |
| 5 | 28.5 | 100,000 | 1.5 | 70 | D5 | 400 | 6 | 27 | 10 | 58 |
| 6c | 85.0 | 100,000 | 15.0 | 0 | — | 130,000 | 3 | 125 | 4 | 142 |
| 1c | 42.5 | 100,000 | 7.5 | 50 | xylene | 40 | 6 | 49 | 8 | 105 |

From Table 2, it will be seen that the best antifoaming properties were obtained in the case of the compositions containing oils (A) of viscosities higher than 10,000 mPa.s.

In Table 2, τ represents the viscosity in mPa.s at 25° C., of the oil (A) or of the antifoam.

The composition of Example 6c, while exhibiting an excellent antifoaming effect, could not be used industrially, being much too viscous.

EXAMPLE 6

Deaeration of a detergent slurry

The starting material was a slurry of conventional composition, comprising:
(i) 17% by weight of a surface-active base comprising a nonionic surface-active agent, a soap and a sodium alkylbenzenesulfonate;
(ii) 45% of water;
(iii) 30% of tripolyphosphate; and
(iv) 8% of sodium sulfate.

2 parts of the antifoam of Example 1 were added to 1,000 parts of this slurry, which was maintained stirred.

Before the addition of the antifoam, the relative density of the slurry was 1.05; it was 1.35 30 minutes after the addition of the antifoam and remained at this value for another 1 hour, 30 minutes.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A fluid organopolysiloxane antifoaming composition, free of inorganic filler material, comprising (A) at least one substantially linear polydimethylsiloxane polymer, (B) a methylpolysiloxane resin comprising recurring structural units of the formulae $R(CH_3)_2SiO_{0.5}$ and $SiO_2$, wherein R is an alkyl radical containing from 1 to 3 carbon atoms, or a vinyl radical, with the ratio of the number of $R(CH_3)_2SiO_{0.5}$ recurring units (M units) to the number of recurring $SiO_{0.5}$ units (Q units) ranging from 0.4 to 1.2, and (C) a cyclic polydiorganosiloxane of the formulae:

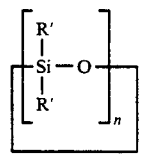

wherein the symbols R', which may be identical or different, are each a radical R or a hydrogen atom, and n is an integer ranging from 3 to 15, said cyclic polydiorganosiloxane (C) being present in an amount effective to act as a diluent for said substantially linear polydimethylsiloxane polymer (A) and said methylpolysiloxane resin (B).

2. The antifoaming composition as defined by claim 1, having a viscosity of less than 50,000 mPa.s at 25° C.

3. The antifoaming composition as defined by claim 2, comprising from 15% to 80% by weight of said at least one polydimethylsiloxane polymer (A), from 1% to 15% by weight of said methylpolysiloxane resin (B), and from 5% to 84% by weight of said cyclic polydiorganosiloxane (C).

4. The antifoaming composition as defined by claim 3, comprising 30% to 50% by weight (A), 3% to 10% by weight (B), and 40% to 67% by weight (C), and having a viscosity of from 100 to 10,000 mPa.s at 25° C.

5. The antifoaming composition as defined by claim 3, the at least one polydimethylsiloxane (A) having a viscosity of from 30,000 150,000 mPa.s at 25° C.

6. The antifoaming composition as defined by claim 3, said methylpolysiloxane resin (B) comprising up to 10% of recurring structural units of the formula $CH_3RSiO$.

7. The antifoaming composition as defined by claim 3, said cyclic polydiorganosiloxane (C) comprising $D_3$, $D_4$, $D_5$ and mixtures thereof, wherein D is a dimethylsiloxyl structural unit.

8. An aqueous emulsion comprising the antifoaming composition as defined by claim 3.

9. The aqueous emulsion as defined by claim 8, comprising an effective amount of a surface-active agent.

10. A normally foaming aqueous system comprising from 1 to 200 parts by weight of the antifoaming composition as defined by claim 3, per million parts by weight thereof.

11. A normally foaming nonaqueous system comprising from 1 to 200 parts by weight of the antifoaming composition as defined by claim 3, per million parts by weight thereof.

12. A method for decreasing or preventing the foaming of an aqueous or nonaqueous foaming system, comprising adding thereto an antifoaming effective amount of the antifoaming composition as defined by claim 3.

13. The method as defined by claim 12, said foaming system comprising a petroleum medium, a biological fermentation medium, a detergent composition or a plant-protection emulsion.

* * * * *